(12) United States Patent
Lin et al.

(10) Patent No.: US 10,841,937 B2
(45) Date of Patent: Nov. 17, 2020

(54) BASE STATION, USER EQUIPMENT, AND METHOD FOR EARLY DATA TRANSMISSION

(71) Applicant: Institute For Information Industry, Taipei (TW)

(72) Inventors: Yi-Ting Lin, New Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/369,197

(22) Filed: Mar. 29, 2019

(65) Prior Publication Data

US 2019/0306873 A1 Oct. 3, 2019

Related U.S. Application Data

(60) Provisional application No. 62/651,088, filed on Mar. 31, 2018.

(51) Int. Cl.
*H04W 74/08* (2009.01)
*H04W 72/12* (2009.01)

(52) U.S. Cl.
CPC ... *H04W 72/1268* (2013.01); *H04W 74/0833* (2013.01)

(58) Field of Classification Search
None
See application file for complete search history.

(56) References Cited

U.S. PATENT DOCUMENTS

2016/0100422 A1* 4/2016 Papasakellariou .... H04L 1/1861
370/329
2019/0159260 A1* 5/2019 Charbit ................ H04L 5/0094

FOREIGN PATENT DOCUMENTS

WO 2017039374 A1 3/2017
WO 2018203727 A1 11/2018

OTHER PUBLICATIONS

3GPP TS 36.213 V15.0.0; Technical Specification Group Radio Access Network; Evolved Universal Terrestrial Radio Access (E-UTRA); Physical layer procedures (Release 15), Dec. 2017, 493 pages.
Office Action to the corresponding Taiwan Patent Application rendered by the Taiwan Intellectual Property Office (TIPO) dated Feb. 10, 2020, 24 pages (including English translation).

* cited by examiner

*Primary Examiner* — Ayanah S George
(74) *Attorney, Agent, or Firm* — Skaar Ulbrich Macari, P.A.

(57) ABSTRACT

A method for early data transmission during a random access procedure including receiving a system information block from a base station; determining, by the user equipment, whether to carry early uplink data in an radio resource control (RRC) connection request message according to a maximum transport block size included in the system information block; and selecting a candidate transport block size from a plurality of optional transport block sizes according to the number of resource units indicated by a random access response message transmitted by the base station, and transmitting the RRC connection request message including the early uplink data to the base station with all or a part of the number of resource units according to the candidate transport block size, if the user equipment determines to carry the early uplink data in the RRC connection request message.

12 Claims, 3 Drawing Sheets

BASE STATION, USER EQUIPMENT, AND METHOD FOR EARLY DATA TRANSMISSION

PRIORITY

This application claims priority to U.S. Provisional Patent Application Ser. No. 62/651,088 filed on Mar. 31, 2018, which is hereby incorporated by reference in its entirety.

FIELD

Embodiments of the present invention relate to a base station, a user equipment and a method for early data transmission. More particularly, the embodiments of the present invention relate to a method for early data transmission during a random access procedure and related base station and user equipment.

BACKGROUND

In conventional cellular communication systems, a user equipment must perform a random access procedure to establish Radio Resource Control (RRC) connection with the base station for any uplink data transmission and/or downlink data transmission. In other words, the user equipment is not able to transmit uplink data to the base station before establishing the RRC connection.

Taking Narrow Band Internet of Things (NB-IoT) system as an example, a random access procedure sequentially includes the following five steps: transmitting a random access request message (i.e. random access preamble) (referred to as Message 1) from a user equipment to a base station; transmitting a random access response message (referred to as Message 2) from the base station to the user equipment; transmitting an RRC connection request message (referred to as Message 3) from the user equipment to the base station; transmitting an RRC connection setup message (referred to as Message 4) from the base station to the user equipment to enable the user equipment to enter an RRC connected mode; and transmitting an RRC connection completeness message (referred to as Message 5) from the user equipment to the base station. There is no uplink data transmission or downlink data transmission in these five messages.

In some improved cellular communication systems, the user equipment may try to carry uplink data (also known as early uplink data) in the RRC connection request message (i.e. Message 3) according to a single and fixed transport block size (TBS) indicated by the base station, in order to perform early data transmission during the random access procedure. However, the data amount of early uplink data is not fixed and the base station is not able to know the same in advance, so such single and fixed transport block size indicated by the base station often fails to meet the early data transmission requirement and therefor limits the use of the early data transmission. In view of this, an urgent need exists in the art to improve the limitation of performing early data transmission during a random access procedure.

SUMMARY

To solve at least the aforesaid problem, certain embodiments of the present invention provide a user equipment for performing a random access procedure with a base station. The user equipment may comprise a transceiver and a processor which is electrically coupled to the transceiver. The transceiver may be configured to receive a system information block and a random access response message from the base station. The processor may be configured to determine whether to carry early uplink data in an RRC connection request message which is to be transmitted to the base station according to a maximum transport block size included in the system information block. If the processor determines to carry the early uplink data in the RRC connection request message, the processor may select a candidate transport block size from a plurality of optional transport block sizes according to the number of resource units indicated by the random access response message, and the transceiver may transmit the RRC connection request message including the early uplink data to the base station with all or a part of the number of resource units according to the candidate transport block size. Each of the optional transport block sizes is not greater than the maximum transport block size.

To solve at least the aforesaid problem, certain embodiments of the present invention provide a method for early data transmission during a random access procedure. The method may comprise:

receiving, by a user equipment, a system information block from a base station;

determining, by the user equipment, whether to carry early uplink data in an RRC connection request message which is to be transmitted to the base station according to a maximum transport block size included in the system information block; and selecting, by the user equipment, a candidate transport block size from a plurality of optional transport block sizes according to the number of resource units indicated by a random access response message transmitted by the base station, and transmitting, by the user equipment, the RRC connection request message including the early uplink data to the base station with all or a part of the number of resource units according to the candidate transport block size, if the user equipment determines to carry the early uplink data in the RRC connection request message.

To solve at least the aforesaid problem, certain embodiments of the present invention provide a base station for performing a random access procedure with a user equipment. The base station may comprise a transceiver and a processor which is electrically coupled to the processor. The transceiver may be configured to transmit a system information block indicating a maximum transport block size and a random access response message indicating the number of resource units to the user equipment, and receive an RRC connection request message including early uplink data from the user equipment. The processor may be configured to blindly decode the RRC connection request message including the early uplink data according to all or a part of the number of resource units and a plurality of optional transport block sizes.

In certain embodiments, if the user equipment intends to carry the early uplink data in the RRC connection request message, the user equipment may, under pre-configured rules, select a most suitable transport block size (i.e., the candidate transport block size) from a plurality of optional transport block sizes which correspond to the number of resource units indicated by the base station according to the data amount of the early uplink data. For example, the user equipment may select a transport block size which corresponds to the data amount of the RRC connection request message including the early uplink data as the candidate transport block size. After the candidate transport block size is selected out, the user equipment transmits the RRC connection request message including the early uplink data to the base station with all or a part of the number of resource units according to the candidate transport block size. In other words, the user equipment does not perform early data transmission according to single and fixed transport block size indicated by the base station any longer. Accordingly, not only can the limitation of performing early data transmission during a random access procedure be improved, but also the transmission resource can be properly used to perform the early data transmission.

What described above is not intended to limit the present invention, but only generally describes the technical problem that can be solved by the present invention, the technical means that can be adopted and the technical effect that can be achieved so that a person having ordinary skill in the art can preliminarily understand the present invention. Details of the embodiments of the present invention can be further understood by a person having ordinary skill in the art according to attached drawings and contents recorded in the following description of the preferred embodiments.

DETAILED DESCRIPTION

The present invention will be described hereinafter with reference to certain example embodiments thereof. However, these example embodiments are not intended to limit that the present invention to only specific operations, environment, applications, structures, embodiments, example, processes or steps described in these example embodiments. In the attached drawings, elements unrelated to the present invention are omitted from depiction, but may be implied by the attached drawings, and dimensions of elements and proportional relationships among individual elements in the attached drawings are only exemplary examples but not intended to limit the present invention. Unless stated particularly, same (or similar) element symbols may correspond to same (or similar) elements in the following description. Unless stated specifically, the number of each element described hereinafter may be one or more while it can be implemented.

Figure 1:
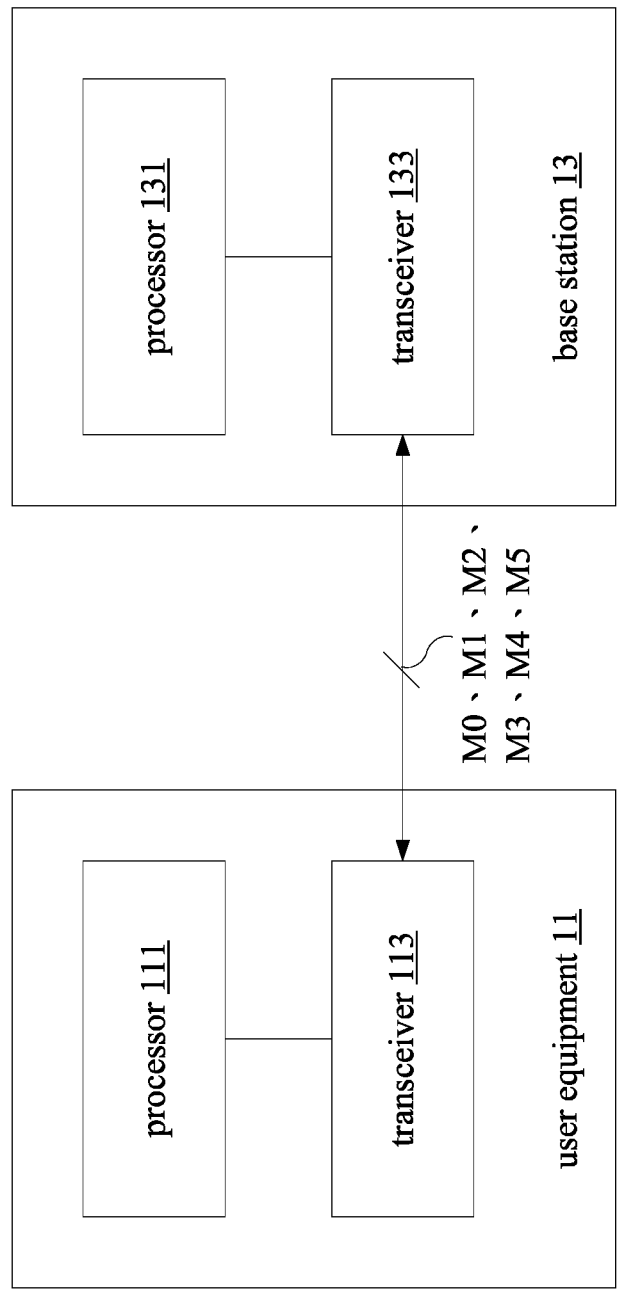
FIG. 1 illustrates a schematic view of a wireless communication system according to some embodiments.

FIG. 1 illustrates a schematic view of a wireless communication system according to some embodiments. Contents shown in FIG. 1 are only for illustrating embodiments of the present invention rather than for limiting the present invention.

Referring to FIG. 1, a wireless communication system 1 may at least comprise a user equipment 11 and a base station 13. The wireless communication system 1 may be one of various communication systems, which include for example but not limited to a Narrow Band-IoT (NB-IoT) system, an enhanced Machine-Type Communication (eMTC) system, a massive Machine-Type Communications (mMTC) system or the like. Depending on different applications, the user equipment 11 and the base station 13 can present different types. For example, the user equipment 11 may be a mobile phone, a tablet computer, a notebook computer or the like, and the base station 13 may be a macrocell base station, a microcell base station, a picocell base station or the like.

The user equipment 11 may comprise a processor 111 and a transceiver 113, and the processor 111 and the transceiver 113 are electrically connected in a direct way or indirect way. The base station 13 may comprise a processor 131 and a transceiver 133, and the processor 131 and the transceiver 133 are electrically connected in a direct way or indirect way.

Each of the processor 111 and the processor 131 may be one of various microprocessors or microcontrollers capable of signal processing. The microprocessor or microcontroller is a special integrated circuit that can be programmed and is capable of operating, storing, outputting/inputting or the like, and can receive and process various coded instructions, thereby performing various logical operations and arithmetical operations and outputting corresponding operational results. The processor 111 may be programmed to interpret various instructions so as to process data and execute various operations or programs in the user equipment 11. The processor 131 may be programmed to interpret various instructions so as to process data and execute various operations or programs in the base station 13.

Each of the transceiver 113 and the transceiver 133 may be formed of a transmitter and a receiver, and may comprise for example but not limited to various communication elements such as an antenna, an amplifier, a modulator, a demodulator, a detector, an analog-to-digital converter, a digital-to-analog converter or the like. The transceiver 113 may enable the user equipment 11 to communicate and exchange data with an external device. The transceiver 133 may enable the base station 13 to communicate and exchange data with an external device.

Figure 2:
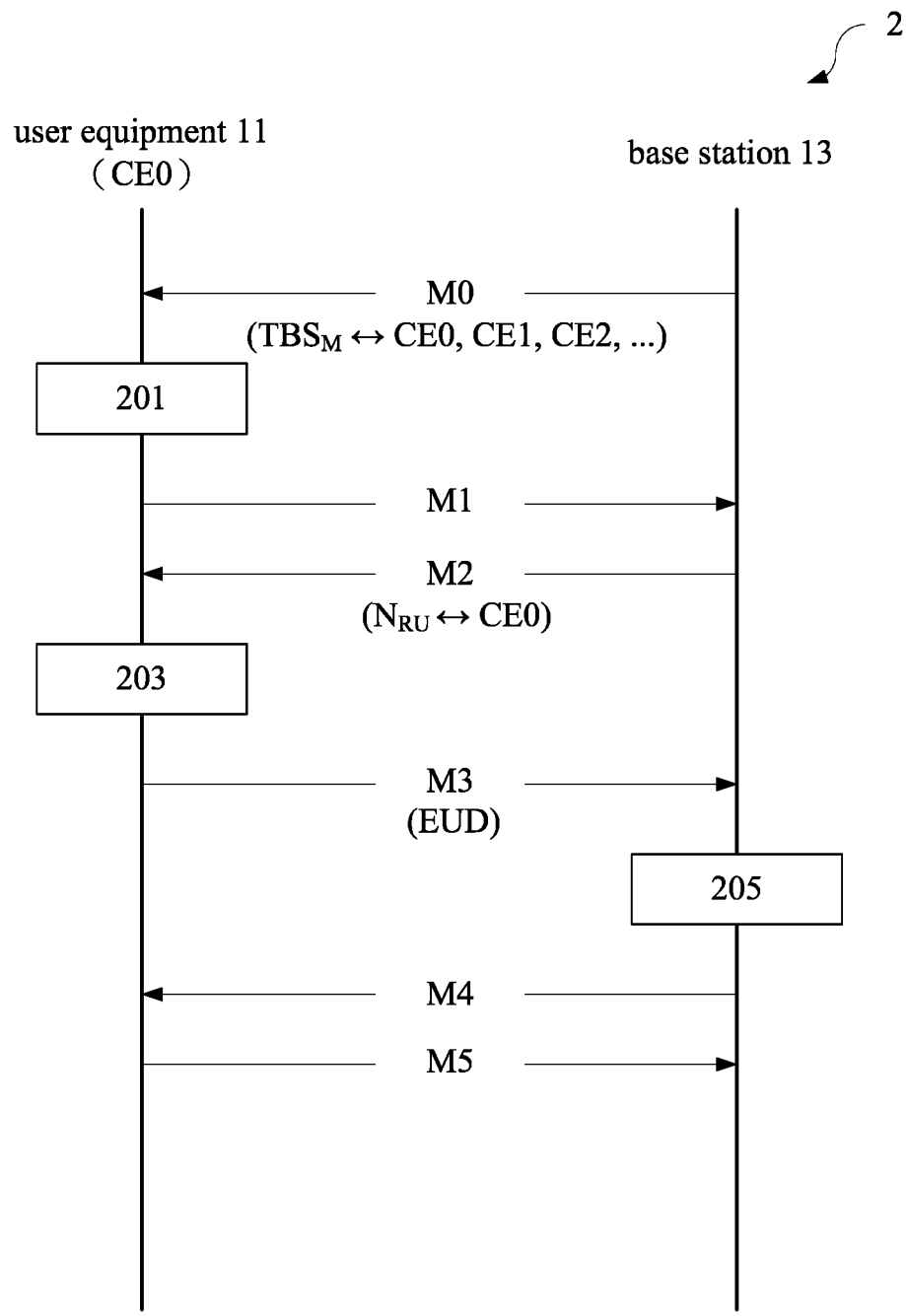
FIG. 2 illustrates a schematic view of early data transmission during a random access procedure performed in the wireless communication system of FIG. 1 according to some embodiments.

FIG. 2 illustrates a schematic view of early data transmission during a random access procedure performed in the wireless communication system of FIG. 1 according to some embodiments. Contents shown in FIG. 2 are only for illustrating the embodiments of the present invention rather than for limiting the present invention.

Referring to FIG. 2, it is assumed that the user equipment 11 is in an RRC idle mode, and the user equipment 11 and the base station 13 are going to perform a random access procedure 2 via the control plane. First, the user equipment 11 receives a system information block M0 broadcast by the base station 13, and the system information block M0 may include a maximum transport block size $TBS_M$. The maximum transport block size $TBS_M$ is used to limit the data amount of the third message (Message 3) M3 which is to be transmitted by the user equipment 11 to the base station 13 during the random access procedure. In some embodiments, the maximum transport block size $TBS_M$ may correspond to a coverage enhancement level (CE level) of the user equipment 11. In the case where the base station 13 knows the current coverage enhancement level of the user equipment 11, the base station 13 can transmit only the maximum transport block size $TBS_M$ which corresponds to the current coverage enhancement level of the user equipment. 11. In the case where the base station 13 does not know the current coverage enhancement level of the user equipment 11, the base station 13 may transmit a plurality of maximum transport block sizes $TBS_M$ which respectively correspond to different coverage enhancement levels (for example, a coverage enhancement level CE0, a coverage enhancement level CE1, a coverage enhancement level CE2, . . . ), and the user equipment 11 may then obtain the corresponding maximum transport block size $TBS_M$ from the plurality of maximum transport block sizes $TBS_M$ according to its own coverage enhancement level. For example, it is shown in FIG. 2 that the user equipment 11 is at the coverage enhancement level CE0, and the system information block M0 broadcasted by the base station 13 comprises three kinds of maximum transport block sizes which correspond to the coverage enhancement level CE0, the coverage enhancement level CE1, and the coverage enhancement level CE2 respectively. In addition, when the user equipment 11 receives the system information block M0, the user equipment 11 will select the corresponding maximum transport block size $TBS_M$ (i.e., the maximum transport block size $TBS_M$ corresponding to the coverage enhancement level CE0) according to its own coverage enhancement level.

In some embodiments, the maximum transport block size $TBS_M$ may be a value between 88 bits and 1000 bits. For example, the maximum transport block size $TBS_M$ may be one of 88 bits, 144 bits, 176 bits, 208 bits, 256 bits, 328 bits, 392 bits, 472 bits, 536 bits, 616 bits, 680 bits, 776 bits, and 1000 bits.

Next, in the operation 201, the user equipment 11 may determine whether to perform early data transmission according to the maximum transport block size $TBS_M$ included in the system information block M0. As the user equipment 11 receives the system information block M0, the user equipment 11 may determine whether the data amount of the third message M3 (i.e., the RRC connection request message M3 including the early uplink data EUD) which is to be transmitted to the base station 13 is smaller than the maximum transport block size $TBS_M$. If it is positive, the user equipment 11 may perform early data transmission and carry the early uplink data EUD in the RRC connection request message M3. However, if it is negative, the user equipment 11 may purely perform the random access procedure in which the user equipment 11 does not carry the early uplink data EUD in the RRC connection request message M3.

If the user equipment 11 decides to perform early data transmission, it may inform the base station 13 that the user equipment 11 will perform early data transmission during this random access procedure by transmitting a random access request message M1 to the base station 13. For example, the user equipment 11 may carry a preamble with a special pattern in the random access request message M1 to inform the base station 13 that the user equipment 11 will perform early data transmission during this random access procedure.

After the base station 13 receives the random access request message M1, the base station 13 may transmit a random access response message M2 which indicates the number of resource units NRU corresponding to the current coverage enhancement level of the user equipment 11 to the user equipment 11.

The number of resource units $N_{RU}$ indicated by the random access response message M2 transmitted by the base station 13 may be associated with the coverage enhancement level of the user equipment 11. That is, when the coverage enhancement level of the user equipment 11 is different, the number of resource units $N_{RU}$ allocated to the user equipment 11 by the base station 13 may also be different. In some embodiments, the higher the coverage enhancement level of the user equipment 11 is, the greater the number of resource units $N_{RU}$ indicated by the random access response message M2 is. For example, when the user equipment 11 is at the coverage enhancement level CE0, the coverage enhancement level CE1, and the coverage enhancement level CE2, the numbers of resource units $N_{RU}$ indicated by the random access response message M2 may be "1," "2," and "4" respectively.

In some embodiments, the base station 13 may indicate the number of resource units $N_{RU}$ with a certain bits of the random access response message M2. In some embodiments, for example, the base station 13 can utilize the last three bits of the uplink grant (UL grant) message which is formed of the thirteenth to twenty-seventh bits of the random access response message M2 to indicate the number of the resource unit $N_{RU}$. The last three bits are also known as Modulation and Coding Scheme Index. For example, the base station 13 may indicate the number of resource units $N_{RU}$ according to TABLE 1 as shown below:

TABLE 1

| The coverage enhancement level of the user equipment 11 | The last three bits of the UL grant message | The number of resource units $N_{RU}$ |
|---|---|---|
| The coverage enhancement level CE0 | 011 | 2 |
|  | 100 | 3 |
|  | 101 | 4 |
|  | 110 | 5 |
|  | 111 | 6 |
| The coverage enhancement level CE1 | 011 | 3 |
|  | 100 | 4 |
|  | 101 | 5 |
|  | 110 | 6 |
|  | 111 | 8 |
| The coverage enhancement level CE2 | 011 | 4 |
|  | 100 | 5 |
|  | 101 | 6 |
|  | 110 | 8 |
|  | 111 | 10 | where for example when the user equipment 11 is at the coverage enhancement level CE0, the base station 13 may use "101" as the last three bits of the UL grant message to indicate that the number of resource units $N_{RU}$ is "4"; and when the user equipment 11 is at the coverage enhancement level CE1, the base station 13 may use "110" as the last three bits of the UL grant message to indicate that the number of resource units $N_{RU}$ is "6." Contents shown in TABLE 1 are only for illustrating the embodiments of the present invention rather than for limiting the present invention.

After receiving the random access response message M2, the user equipment 11 may perform the operation 203. Specifically, the user equipment 11 may select a candidate transport block size from a plurality of optional transmissions block sizes according to the number of resource units $N_{RU}$ indicated by the random access response message M2, and may transmit the RRC connection request message M3 including the early uplink data EUD to the base station 13 with all or a part of the number of resource units $N_{RU}$ according to the candidate transport block size.

In some embodiments, the user equipment 11 may transmit the RRC connection request message M3 including the early uplink data EUD to the base station 13 with only a part of the number of resource units $N_{RU}$ to avoid collision with other user equipment and therefor failure of uploading data. If the user equipment 11 is going to transmit the RRC connection request message M3 including the early uplink data EUD to the base station 13 with only a part of the number of resource units $N_{RU}$, one or a plurality of consecutive resource units can be selected from the indicated number of resource units $N_{RU}$. For example, if the number of resource units $N_{RU}$ indicated by the random access response message M2 is "4", the user equipment 11 may use any one of the four resource units (e.g., the first resource unit), any two consecutive resource units (e.g., the first and second resource units, or the second and third resource units), or any three consecutive resource units (e.g., the second, third, and fourth resource units).

The correspondence between the number of resource units and the pre-configured transport block size may be established in advance and it is adjustable depending different requirements. TABLE 2 shows a correspondence between the number of resource units and the pre-configured transport block size. Contents shown in TABLE 2 are only for illustrating the embodiments of the present invention rather than for limiting the present invention. Referring to TABLE 2, for example, if the number of resource units $N_{RU}$ indicated by the random access response message M2 is "3", the corresponding pre-configured transport block sizes will be "56," "88," "144," "176," "208," "224," "256," "328," "392," "456," "504," "584," and "680." Also, if the number of resource units $N_{RU}$ indicated by the random access response message M2 is "4," the corresponding pre-configured transport block size will be "88," "144," "176," "208," "256," "328," "392," "472," "536," "616," "680," "776," "1000."

TABLE 2

| Index of pre-configured transport block size | The number of resource unit $N_{RU}$ | | | | | | | |
|---|---|---|---|---|---|---|---|---|
| | 1 | 2 | 3 | 4 | 5 | 6 | 7 | 8 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | |
| 8 | 120 | 256 | 392 | 536 | 680 | 808 | | |
| 9 | 136 | 296 | 456 | 616 | 776 | 936 | | |
| 10 | 144 | 328 | 504 | 680 | 872 | 1000 | | |
| 11 | 176 | 376 | 584 | 776 | 1000 | | | |
| 12 | 208 | 440 | 680 | 1000 | | | | |

According to the number of resource units $N_{RU}$ indicated by the random access response message M2, the user equipment 11 may, under a pre-configured rule, select a plurality of optional transport block sizes from a plurality of pre-configured transport block sizes so as to select the candidate transport block size from the plurality of optional transport block sizes. For example, referring to TABLE 2, if the number of resource units $N_{RU}$ indicated by the random access response message M2 is "4," and the maximum transport block size $TBS_M$ indicated by the system information block M0 is "800,", the user equipment 11 may select a minimum optional transport block size (e.g., "328 bits"), a maximum optional transport block size (e.g., "776 bits"), and two intermediate optional transport block sizes (e.g. "472 bits" and "616 bits") which are between the minimum optional transport block size and the maximum optional transport block size from the plurality of pre-configured transport block sizes corresponding to the number of resource units $N_{RU}$ "4" according to the following rules: each optional transport block size is not smaller than a minimum value (for example, being greater than or equal to "320 bits"); each optional transport block size is not greater than a maximum value (i.e., being smaller than or equal to "800 bits" which is specified by the maximum transport block size $TBS_M$); and the difference of every two adjacent transport block sizes of the selected optional transport block sizes is minimized. The base station 13 and the user equipment 11 may pre-configured the minimum value according to different requirements.

In some embodiments, when selecting two intermediate optional transport block sizes from five pre-configured transport block sizes is required, the user equipment 11 may select the intermediate optional transport block sizes every other pre-configured transport block size. For example, referring to TABLE 2, if the number of resource units $N_{RU}$ indicated by the random access response message M2 is "4", and selecting two intermediate optional transport block sizes from "392 bits," "472 bits," "536 bits," "616 bits," and "680 bits" is required, the user equipment 11 may select "472 bits" and "616 bits" as the intermediate optional transport block sizes.

In some embodiments, when selecting two intermediate optional transport block sizes from four pre-configured transport block sizes is required, the user equipment 11 may first select the largest one of the four pre-configured transport block sizes as one of the intermediate optional transport block sizes, and then select another pre-configured transport block size with an interval from the largest one as the other intermediate optional transport block. For example, referring to TABLE 2, if the number of resource units $N_{RU}$ indicated by the random access response message M2 is "4," and selecting two intermediate optional transport block sizes from "472 bits," "536 bits," "616 bits," and "680 bits" is required, the user equipment 11 may select "680 bit" and "536 bit" as the intermediate optional transport block sizes.

In some embodiments, when selecting two intermediate optional transport block sizes from three pre-configured transport block sizes is required, the user equipment 11 may select the largest two of the three pre-configured transport block sizes as the intermediate optional transport block sizes. For example, referring to TABLE 2, if the number of resource units $N_{RU}$ indicated by the random access response message M2 is "4," and selecting two intermediate optional transport block sizes from "536 bits," "616 bits," and "680 bits" is required, the user equipment 11 may select "616 bits" and "680 bits" as the intermediate optional transmission block sizes.

When the difference of every two adjacent transport block sizes of the plurality of optional transport block sizes is minimized, the number of zero padding can be reduced in the RRC connection request message M3 may be reduced, and the code rate can be increased.

After receiving the RRC connection request message M3, the base station 13 may perform the operation 205. In the operation 205, as same as the user equipment 11, the base station 13 may, under the same pre-configured rule, select a plurality of optional transport block sizes from a plurality of pre-configured transport block sizes corresponding to the number of resource units $N_{RU}$ indicated by the random access response message M2, and blindly decode the RRC connection request message M3 including the early uplink data EUD according to all or a part of the number of resource units $N_{RU}$ and the plurality of optional transport block sizes. For example, referring to TABLE 2, if the number of resource units $N_{RU}$ indicated by the base station 13 is "4," and the user equipment 11 selects "328 bits", "472 bits", "616 bits" and "776 bits" as the optional transport block sizes from a plurality of pre-configured transport block sizes corresponding to the number of resource units $N_{RU}$ "4", and the base station 13 may blindly decode the RRC connection request message M3 including the early uplink data EUD according to the four optional transport block sizes of "328 bits", "472 bits", "616 bits" and "776 bits." For example, the base station 13 may blindly decode the RRC connection request message M3 including the early uplink data EUD according to any one of the four optional transport block sizes of "328 bits", "472 bits", "616 bits," and "776 bits" arbitrarily until the RRC connection request message M3 including the early uplink data EUD is decoded out successfully.

In some embodiments, if the user equipment 11 transmits the RRC connection request message M3 including the early uplink data EUD with only a part of the number of resource units $N_{RU}$ indicated by the base station 13, the base station 13 may need to perform the blind decoding repeatedly according to various permutations of the number of resource units $N_{RU}$, until the RRC connection request message M3 including the early uplink data EUD is decoded out successfully. For example, if the number of resource units $N_{RU}$ indicated by the random access response message M2 is "4," it required for the base station 13 to perform the blind decoding with each of the four resource units, any consecutive two of the four resource units (i.e., the first and second resource units, the second and third resource units, or the third and fourth resource units), or any consecutive three of the four resource units (i.e., the first to third resource units, or the second to fourth resource units).

During the same random access procedure, the correspondence between the number of resource units $N_{RU}$ and the pre-configured transport block size is fixed (for example, as the correspondence shown in TABLE 2), and the user equipment 11 and the base station 13 user the same pre-configured rules to select the plurality of optional transport block sizes from the pre-configured transport block sizes.

In some embodiments, the RRC connection between the user equipment 11 and the base station 13 may still be established after the user equipment 11 transmitting the RRC connection request message M3 including the early uplink data EUD. In this case, the base station 13 may transmit an RRC connection setup message M4 to the user equipment 11 after successfully decoding out the RRC connection request message M3 including the early uplink data EUD to ask the user equipment 11 to enter the RRC connected mode. After entering the RRC connected mode, the user equipment 11 may transmit an RRC connection completeness message M5 to the base station 13.

In some embodiments, the RRC connection between the user equipment 11 and the base station 13 may not be established after the user equipment 11 transmitting the RRC connection request message M3 including the early uplink data EUD. In this case, the base station 13 may transmit an early data transmission completeness message (not shown) to the user equipment 11 after successfully decoding out the RRC connection request message M3 including the early uplink data EUD. Then, the user equipment 11 may transmit a Hybrid Automatic Repeat Request (HARQ) feedback message (not shown) to the base station 13 and remain in the RRC idle mode.

Figure 3:
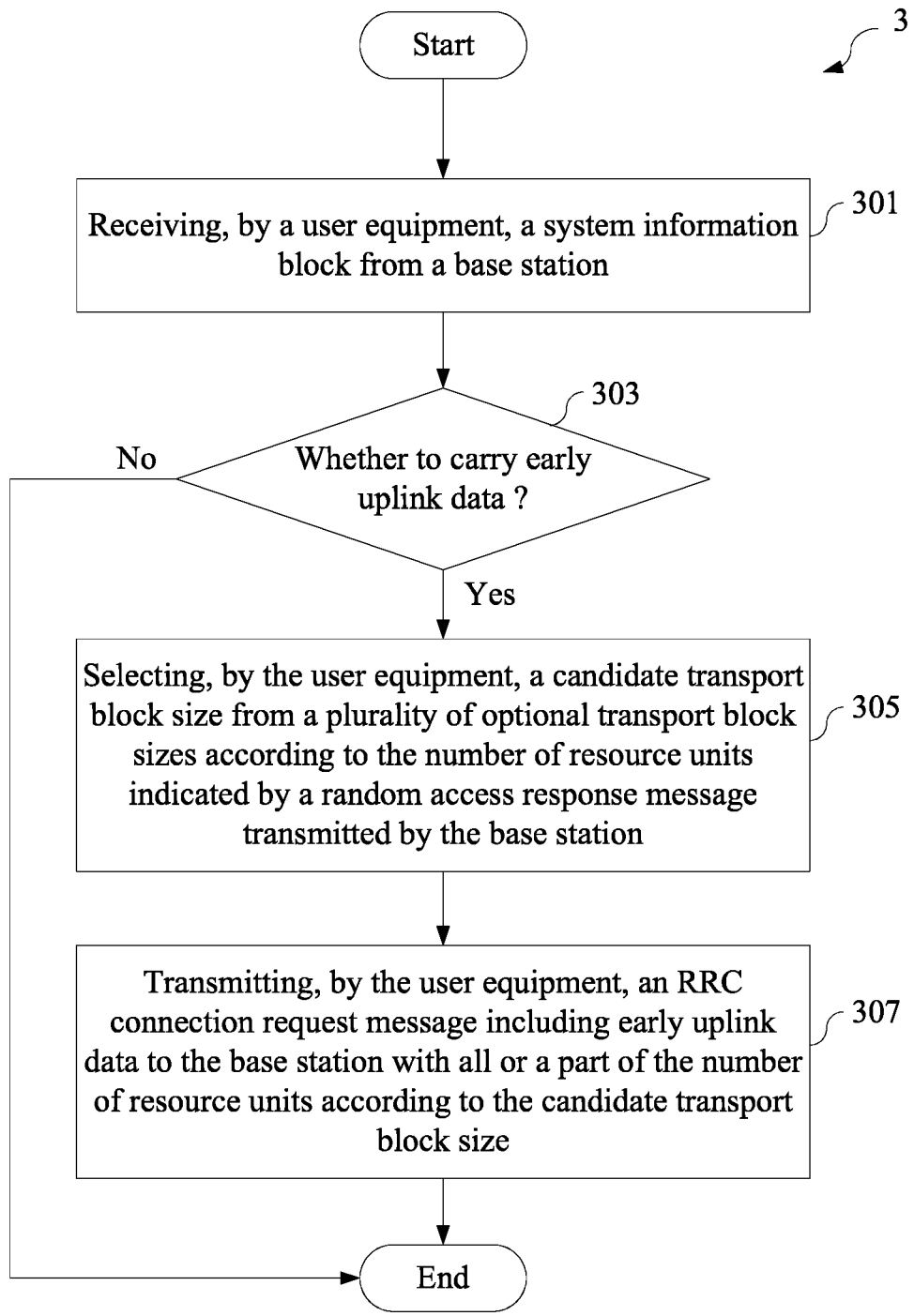
FIG. 3 illustrates a schematic view of a method for early data transmission during a random access procedure according to some embodiments.

FIG. 3 illustrates a schematic view of a method for early data transmission during a random access procedure according to some embodiments. Contents shown in FIG. 3 are only for illustrating the embodiments of the present invention rather than for limiting the present invention.

Referring to FIG. 3, a method 3 for early data transmission during a random access procedure may comprise the following steps:

receiving, by a user equipment, a system information block from a base station (labeled as step 301);

determining, by the user equipment, whether to carry early uplink data in an RRC connection request message which is to be transmitted to the base station according to a maximum transport block size included in the system information block (labeled as step 303);

selecting, by the user equipment, a candidate transport block size from a plurality of optional transport block sizes according to the number of resource units indicated by a random access response message transmitted by the base station (labeled as step 305), and transmitting, by the user equipment, the RRC connection request message including the early uplink data to the base station with all or a part of the number of resource units according to the candidate transport block size (labeled as step 307), if the user equipment determines to carry the early uplink data in the RRC connection request message.

The order in which the steps 301 to 307 of FIG. 3 are executed is not limited and may be adjusted while it still can be implemented.

In some embodiments, the maximum transport block size may correspond to a coverage enhancement level of the user equipment.

In some embodiments, the number of resource units indicated by the random access response message may be associated with a coverage enhancement level of the user equipment.

In some embodiments, the number of resource units indicated by the random access response message may correspond to a coverage enhancement level of the user equipment. In addition, the higher the coverage enhancement level of the user equipment is, the greater the number of resource units indicated by the random access response message is.

In some embodiments, the number of resource units indicated by the random access response message may correspond to a plurality of pre-configured transport block sizes, and the method 3 for early data transmission may further comprise the following step in addition to the steps 301 to 307:

selecting, by the user equipment, the plurality of optional transport block sizes from the plurality of pre-configured transport block sizes so as to select the candidate transport block size from the plurality of optional transport block sizes.

In some embodiments, the number of resource units indicated by the random access response message may correspond to a plurality of pre-configured transport block sizes, and the method 3 for early data transmission may further comprise the following step in addition to the steps 301 to 307:

selecting, by the user equipment, the plurality of optional transport block sizes from the plurality of pre-configured transport block sizes so as to select the candidate transport block size from the plurality of optional transport block sizes, with a minimum of difference of every two adjacent transport block sizes of the plurality of optional transport block sizes. In addition, the optional transport block sizes may comprise a minimum optional transport block size, a maximum optional transport block size, and at least one intermediate optional transport block size which is between the minimum optional transport block size and the maximum optional transport block size from the plurality of pre-configured transport block sizes.

In some embodiments, the aforesaid all steps of the method 3 for early data transmission may be executed in the wireless communication system 1. In addition to the aforesaid steps, the method 3 for early data transmission may also comprise other steps corresponding to the aforesaid all embodiments associated with the wireless communication system 1. These other steps shall be appreciated by a person having ordinary skill in the art depending on the above description for the wireless communication system 1, and thus will not be further described herein.

The above disclosure is related to the detailed technical contents and inventive features thereof. A person having ordinary skill in the art may proceed with a variety of modifications and replacements according to the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment for performing a random access procedure with a base station, comprising:
    a transceiver, being configured to receive a system information block and a random access response message from the base station; and
    a processor, being electrically coupled to the transceiver and configured to determine whether to carry early uplink data in a radio resource control (RRC) connection request message which is to be transmitted to the base station according to a maximum transport block size included in the system information block;
    wherein if the processor determines to carry the early uplink data in the RRC connection request message, the processor selects a candidate transport block size from a plurality of optional transport block sizes according to the number of resource units indicated by the random access response message, and the transceiver transmits the RRC connection request message including the early uplink data to the base station with all or a part of the number of resource units according to the candidate transport block size;
    wherein each of the optional transport block sizes is not greater than the maximum transport block size;
    wherein the number of resource units indicated by the random access response message corresponds to a plurality of pre-configured transport block sizes, and the processor selects the plurality of optional transport block sizes from the plurality of pre-configured transport block sizes so as to select the candidate transport block size from the plurality of optional transport block sizes; and
    wherein with a minimum difference between adjacent transport block sizes, the processor selects a minimum optional transport block size, a maximum optional transport block size, and at least one intermediate optional transport block size which is between the minimum optional transport block size and the maximum optional transport block size from the plurality of pre-configured transport block sizes.

2. The user equipment of claim 1, wherein the maximum transport block size corresponds to a coverage enhancement level of the user equipment.

3. The user equipment of claim 1, wherein the number of resource units indicated by the random access response message is associated with a coverage enhancement level of the user equipment.

4. The user equipment of claim 3, wherein the higher the coverage enhancement level of the user equipment is, the greater the number of resource units indicated by the random access response message is.

5. A method for early data transmission during a random access procedure, comprising:
    receiving, by a user equipment, a system information block from a base station;
    determining, by the user equipment, whether to carry early uplink data in a radio resource control (RRC) connection request message which is to be transmitted to the base station according to a maximum transport block size included in the system information block;
    selecting, by the user equipment, a plurality of optional transport block sizes from a plurality of pre-configured transport block sizes so as to select a candidate transport block size from the plurality of optional transport block sizes; and
    selecting, by the user equipment, the candidate transport block size from the plurality of optional transport block sizes according to the number of resource units indicated by a random access response message transmitted by the base station, and transmitting, by the user equipment, the RRC connection request message including the early uplink data to the base station with all or a part of the number of resource units according to the candidate transport block size, if the user equipment determines to carry the early uplink data in the RRC connection request message;
    wherein the number of resource units indicated by the random access response message corresponds to the plurality of pre-configured transport block sizes; and
    wherein the step of selecting the plurality of optional transport block sizes further comprises: selecting, by the user equipment, a minimum optional transport block size, a maximum optional transport block size, and at least one intermediate optional transport block size which is between the minimum optional transport block size and the maximum optional transport block size from the plurality of pre-configured transport block sizes, with a minimum difference between adjacent transport block sizes.

6. The method of claim 5, wherein the maximum transport block size corresponds to a coverage enhancement level of the user equipment.

7. The method of claim 5, wherein the number of resource units indicated by the random access response message is associated with a coverage enhancement level of the user equipment.

8. The method of claim 7, wherein the higher the coverage enhancement level of the user equipment is, the greater the number of resource units indicated by the random access response message is.

9. A base station for performing a random access procedure with a user equipment, comprising:
    a transceiver, being configured to transmit a system information block indicating a maximum transport block size and a random access response message indicating the number of resource units to the user equipment, and receive an RRC connection request message including early uplink data from the user equipment; and
    a processor, being electrically coupled to the transceiver and configured to blindly decode the RRC connection request message including the early uplink data according to all or a part of the number of resource units and a plurality of optional transport block sizes;
    wherein the number of resource units indicated by the random access response message corresponds to a plurality of pre-configured transport block sizes, and the processor selects the plurality of optional transport block sizes from the plurality of pre-configured transport block sizes so as to blindly decode the RRC connection request message including the early uplink data according to all or a part of the number of resource units and the plurality of optional transport block sizes; and wherein with a minimum difference between adjacent transport block sizes, the processor selects a minimum optional transport block size, a maximum optional transport block size, and at least one intermediate optional transport block size which is between the minimum optional transport block size and the maximum optional transport block size from the plurality of pre-configured transport block sizes.

10. The base station of claim 9, wherein the maximum transport block size corresponds to a coverage enhancement level of the user equipment.

11. The base station of claim 9, wherein the number of resource units indicated by the random access response message is associated with a coverage enhancement level of the user equipment.

12. The base station of claim 11, wherein the higher the coverage enhancement level of the user equipment is, the greater the number of resource units indicated by the random access response message is.

* * * * *